US012796851B2

(12) United States Patent
Pettit et al.

(10) Patent No.: US 12,796,851 B2
(45) Date of Patent: Nov. 17, 2026

(54) SECURE STORAGE SYSTEM

(71) Applicant: VJ Technology Limited, Ashford (GB)

(72) Inventors: Mark Andrew Pettit, Gaydon (GB); Alvin Lee Evans, Dymchurch (GB); Andrew Graham Mobbs, East Farleigh (GB)

(73) Assignee: VJ Technology Limited, Ashford (GB)

( * ) Notice: Subject to any disclaimer, the term of this patent is extended or adjusted under 35 U.S.C. 154(b) by 0 days.

(21) Appl. No.: 19/150,121

(22) PCT Filed: Oct. 3, 2023

(86) PCT No.: PCT/GB2023/052551
§ 371 (c)(1),
(2) Date: Jul. 22, 2025

(87) PCT Pub. No.: WO2024/161099
PCT Pub. Date: Aug. 8, 2024

(65) Prior Publication Data

US 2026/0114650 A1 Apr. 30, 2026

(30) Foreign Application Priority Data

Jan. 30, 2023 (GB) ...................................... 2301278

(51) Int. Cl.
*A47G 29/14* (2006.01)
*E05G 1/10* (2006.01)
*G07C 9/00* (2020.01)

(52) U.S. Cl.
CPC ............. *A47G 29/141* (2013.01); *E05G 1/10* (2013.01); *G07C 9/00563* (2013.01);
(Continued)

(58) Field of Classification Search
CPC .... A47G 29/141; E05G 1/10; G07C 9/00563; G07C 9/00571; G07C 9/00896
(Continued)

(56) References Cited

U.S. PATENT DOCUMENTS 8,752,146 B1 * 6/2014 van Dijk ............. H04L 63/0861 713/184
10,097,353 B1 10/2018 Carlson et al.
(Continued)

FOREIGN PATENT DOCUMENTS

EP 3671672 A1 6/2020
EP 4120210 A1 * 1/2023 ........... G08B 25/008
GB 2593652 A * 9/2021 ......... G07C 9/00912

OTHER PUBLICATIONS

Codegate G1 Unmanned Store. YouTube, Nov. 10, 2021, www.youtube.com/watch?v=MNz3cEPhZ5s. Accessed Jul. 22, 2025.
(Continued)

*Primary Examiner* — Yong Hang Jiang
(74) *Attorney, Agent, or Firm* — Cognition IP, P.C.; Edward Steakley

(57) ABSTRACT

A secure storage system comprising: a server; a container comprising: a door; a user input device; an electronic lock, the electronic lock configured to lock the door in a closed position thereby restricting access to the container; one or more sensors; and an alarm system, wherein, in an active state the alarm system is configured to be triggered in the event of unauthorised access to the container or an unauthorised retrieval of one or more objects from the container. The server is configured to communicate with the electronic lock, the one or more sensors, the alarm system and the first user device, the server configured to: receive, from a first user device, a first request for retrieval of a first object from the container; determine whether the first request associated
(Continued)

with a first user device meets one or more predefined criteria; and if the first request meets the one or more predefined criteria, generate verification information specific to the first request; receive user input information from the user input device; compare the user input information to the verification information; and if the user input information is determined to conform with the verification information, the server is configured to: transmit a disarm instruction to the alarm system, wherein the alarm system is configured to enter a disarmed state responsive to receiving the disarm instruction; transmit an access control instruction to the electronic lock, wherein the electronic lock is configured to unlock the door responsive to receiving the access control instruction, thereby enabling access to the container; transmit an activation instruction to the one or more sensors, wherein the one or more sensors are configured to determine when the first object has been removed from the container responsive to receiving the activation instruction; receive a signal from the one or more sensors indicative of the first object having been retrieved.

20 Claims, 2 Drawing Sheets

(52) U.S. Cl.
CPC ..... *G07C 9/00571* (2013.01); *G07C 9/00896* (2013.01); *A47G 2029/145* (2013.01)

(58) Field of Classification Search
USPC .......................................................... 340/5.73
See application file for complete search history.

(56) References Cited

U.S. PATENT DOCUMENTS

| | | | | |
|---|---|---|---|---|
| 10,339,750 | B1 | 7/2019 | Wegelin | |
| 10,573,106 | B1 | 2/2020 | Brady et al. | |
| 10,607,465 | B1 * | 3/2020 | Subramanian | G07C 9/00571 |
| 11,195,355 | B1 | 12/2021 | Goetz et al. | |
| 12,400,503 | B2 * | 8/2025 | Young | G06Q 20/32 |
| 2006/0237427 | A1 | 10/2006 | Logan | |
| 2010/0198728 | A1 | 8/2010 | Aabye et al. | |
| 2015/0254603 | A1 | 9/2015 | Bashkin et al. | |
| 2017/0103595 | A1 | 4/2017 | Taylor et al. | |
| 2017/0293885 | A1 * | 10/2017 | Grady | G06K 7/10009 |
| 2018/0061164 | A1 * | 3/2018 | Scalisi | G08B 3/10 |
| 2018/0091782 | A1 | 3/2018 | Bashkin et al. | |
| 2018/0181126 | A1 | 6/2018 | Seaman et al. | |
| 2018/0322719 | A1 | 11/2018 | Jones et al. | |
| 2019/0122167 | A1 | 4/2019 | Bashkin | |
| 2019/0304219 | A1 * | 10/2019 | Phillips | G06F 21/31 |
| 2019/0323798 | A1 | 10/2019 | Link et al. | |
| 2020/0005238 | A1 * | 1/2020 | Richardson | A47G 29/141 |
| 2020/0301883 | A1 * | 9/2020 | Kamiya | G06F 16/278 |
| 2020/0410446 | A1 | 12/2020 | Rahilly et al. | |
| 2021/0012400 | A1 | 1/2021 | Locke et al. | |
| 2021/0049846 | A1 | 2/2021 | Kashi et al. | |
| 2021/0203667 | A1 * | 7/2021 | Bondugula | G06F 21/31 |
| 2021/0321807 | A1 | 10/2021 | Needler | |
| 2022/0292453 | A1 * | 9/2022 | Durkee | G06Q 10/0836 |

OTHER PUBLICATIONS

"Multi-Factor Authentication." Wikipedia, Jan. 2, 2023, en.wikipedia.org/w/index.php?title=Multifactor_authentication&oldid=1131088613. Accessed Jul. 22, 2025.
"Speedy ePod Self-Service Hire Portal." YouTube, Oct. 17, 2014, www.youtube.com/watch?v=T9IfNIVR35w. Accessed Jul. 22, 2025.
"Speedy ePod." YouTube, Jul. 9, 2013, www.youtube.com/watch?v=9VsPgBW7fRA. Accessed Jul. 22, 2025.
Third Party Observation received in GB application No. GB2301278.4, mailed on Aug. 16, 2024.
Third Party Observation received in GB application No. GB2301278.4, mailed on Sep. 19, 2024.
Third Party Observation received in PCT application No. PCT/GB2023/052551, mailed on Oct. 7, 2024.
International Search Report and Written Opinion of the International Search Authority received in PCT application No. PCT/GB2023/052551, mailed on Jan. 24, 2024.
Patents Act 1977: Search Report under Section 17 received in GB application No. GB2301278.4, mailed on Jul. 27, 2023.
International Preliminary Report on Patentability received in PCT application No. PCT/GB2023/052551, mailed on May 23, 2025.
Office Action received in counterpart Canadian application No. 3,278,293, mailed on Nov. 20, 2025.

* cited by examiner

SECURE STORAGE SYSTEM

CROSS-REFERENCE TO RELATED APPLICATIONS

This application is a 35 U.S.C. § 371 U.S. National Stage Application of International Application No. PCT/GB2023/052551, filed on Oct. 3, 2023, which claims priority to Great Britain Patent Application No. 2301278.4, filed on Jan. 30, 2023, which are incorporated herein by reference in their entirety.

FIELD OF INVENTION

The present invention relates to a secure storage system, more particularly a secure storage system wherein access to objects stored within the system is controlled remotely.

BACKGROUND

Secure storage of objects is required in many contexts but is often difficult where no permanent or dedicated storage facilities exist. In the absence of dedicated local secure storage provisions, objects are typically stored remote from their point of need, requiring dedicated transport from their point of storage. Not only is this inconvenient, but dedicated transportation has implications for energy/fuel consumption and greenhouse gas emissions.

An example of this is found in the construction industry. Construction sites are often remote from secure construction material supplier facilities. Ensuring that the correct materials and components are present and secure at the construction site for a given stage in the construction process thus requires accurately timed deliveries from remote storage sites, which is often difficult, and adds to the overall environmental impact of the construction program.

There is thus a need for a storage solution that can be deployed at sites, for example where no permanent storage facilities exist, that maintains security of, and controls access to, objects to be stored in a robust and efficient manner.

SUMMARY OF INVENTION

In order to mitigate at least some of the issues above, there is provided a secure storage system and a method of controlling a secure storage system as set out in the appended independent claims. Optional features are set out in the dependent claims.

In a first aspect of the invention, there is provided a secure storage system comprising: a server; a container (for example a portable container such as an intermodal container) comprising: a door; a user input device; an electronic lock, the electronic lock configured to lock the door in a closed position thereby restricting access to the container; one or more sensors; and an alarm system, wherein, in an active state the alarm system is configured to be triggered in the event of unauthorised access to the container or an unauthorised retrieval of one or more objects from the container. The server is configured to communicate with the electronic lock, the one or more sensors, the alarm system and the first user device, the server configured to: receive, from a first user device, a first request for retrieval of a first object from the container; determine whether the first request associated with a first user device meets one or more predefined criteria; and if the first request meets the one or more predefined criteria, generate verification information specific to the first request; receive user input information from the user input device; compare the user input information to the verification information; and if the user input information is determined to conform with the verification information, the server is configured to: transmit a disarm instruction to the alarm system, wherein the alarm system is configured to enter a disarmed state responsive to receiving the disarm instruction; transmit an access control instruction to the electronic lock, wherein the electronic lock is configured to unlock the door responsive to receiving the access control instruction, thereby enabling access to the container; transmit an activation instruction to the one or more sensors, wherein the one or more sensors are configured to determine when the first object has been removed from the container responsive to receiving the activation instruction; receive a signal from the one or more sensors indicative of the first object having been retrieved.

Beneficially, this system is easily scalable (for example according to the size and quantity of objects to be stored) and can be implemented using a portable container or a permanent container, making it deployable in a wide variety of contexts. The electronic lock, user input device, one or more sensors and alarm system can also be readily retrofitted to existing containers (for example intermodal containers, existing buildings/rooms, etc.), again enhancing the scalability and variety of contexts it can be deployed in. In the preferred embodiment, the server comprises an API interface and the electronic lock, the one or more sensors, the alarm system and a first user device are each connected to a network, individually addressable, and configured to communicate with the API interface via the network. This advantageously further enhances the scalability of the system by allowing central configuration and control at a remote server, and optionally removing the requirement for dedicated system control hardware at the container itself.

In a preferred embodiment, the verification information comprises an expected user input information and a first time window for receiving user input; wherein the server determines that the user input information conforms with the verification information if: the received user input information matches the expected user input information; and the received user input information is received within the first time window.

Optionally, the server is further configured to: receive, prior to receiving user input information, a second request from the first user device, the second request specifying a second time window; and update the verification information with the second time window; wherein the server determines that the user input information conforms with the updated verification information if: the received user input information matches the expected user input information; and the received user input information is received within the second time window.

In some embodiments, the verification information comprises an access code; and the user input device comprises a user interface for entering the access code. Alternatively, or in addition, the verification information comprises a unique identifier associated with or provided to the first user device or another user device; and the user input device comprises a wireless communication module configured to receive the unique identifier from the first user device or the another user device. Alternatively, or in addition, the verification information comprises retrieved image or biometric information; and the user input device comprises a camera and/or biometric information scanner.

In the preferred embodiment, the one or more sensors comprise: one or more cameras in communication with a machine vision system; wherein the machine vision system is configured to analyse images captured by the one or more cameras to identify retrieval of an object from the container, and determine whether the retrieved object corresponds to the first object. Alternatively, or in addition, the one or more sensors optionally comprise: an optical scanner configured to scan machine-readable indicia.

In a further aspect of the present invention, there is provided a method for operating a secure storage system, the secure storage system comprising a server and a container comprising a door, a user input device, an electronic lock, one or more sensors and an alarm system. The method comprises: receiving, at the server and from a first user device, a first request for retrieval of a first object from the container; determining, by the server, whether the first request associated with a first user device meets one or more predefined criteria; and if the first request meets the one or more predefined criteria, generating, by the server, verification information specific to first request; receiving, by the user input device, user input information; transmitting, by the user input device, the user input information input to the server; comparing, by the server, the user input information to the verification information; and if the user input information is determined to conform with the verification information: transmitting, by the server, a disarm instruction to the alarm system; responsive to receiving the disarm instruction, entering, by the alarm system, a disarmed state; transmitting, by the server, an access control instruction to the electronic lock; responsive to receiving the access control instruction, unlocking, by the electronic lock, the door; transmitting, by the server, an activation instruction signal to the electronic lock; responsive to receiving the activation instruction, determining, by the one or more sensors, whether an object has been retrieved from the container; transmitting, by the one or more sensors, a signal indicative of the first object having been retrieved.

Preferably the verification information comprises an expected user input information and a first time window for receiving user input. In this case determining that the user input information conforms with the verification information comprises: determining that the received user input information matches the expected user input information; and determining that the received user input information is received within the first time window.

Optionally the method further comprises: receiving, at the server and prior to receiving user input information, a second request from the first user device, the second request specifying a second time window; and updating, by the server, the verification information with a second time window; wherein determining that the user input information conforms with the updated verification information comprises: determining that the received user input information matches the expected user input information; and determining that the received user input information is received within the second time window.

Optionally the verification information comprises an access code; and the method comprises receiving the user input information comprises receiving entry of the access code at a user interface of the user input device. Alternatively, or in addition, the verification information comprises a unique identifier associated with or provided to the first user device or another user device; and the method comprises receiving the user input information comprises receiving the unique identifier from the first user device or the another user device via a wireless communication module at the user input device. Alternatively, or in addition, the verification information comprises retrieved image or biometric information; and the method comprises receiving the user input information comprises detecting the biometric information using a camera and/or a biometric information scanner at the user input device.

In the preferred embodiment, the one or more sensors comprise one or more cameras in communication with a machine vision system, and the method comprises: capturing, by the one or more cameras, one or more images; analysing, by the machine vision system, the one or more images to identify retrieval of an object from the container; determining, by the machine vision system, that the retrieved object corresponds to the first object; generating, by the machine vision system, the signal from the one or more sensors indicative of the first object having been retrieved. Alternatively, or in addition, the one or more sensors comprise an optical scanner, and the method comprises: reading, by the optical scanner, machine readable indicia on the first object; generating, by optical scanner, the signal from the one or more sensors indicative of the first object having been retrieved.

In another aspect of the invention, there is provided a computer-readable medium (for example a non-transitory computer readable medium) storing executable instructions that, when executed by one or more processors, cause the processors to perform the method above.

BRIEF DESCRIPTION OF THE DRAWINGS

Embodiments of the present invention will now be described, by way of example only, with reference to the following figures in which.

DETAILED DESCRIPTION

Figure 1:
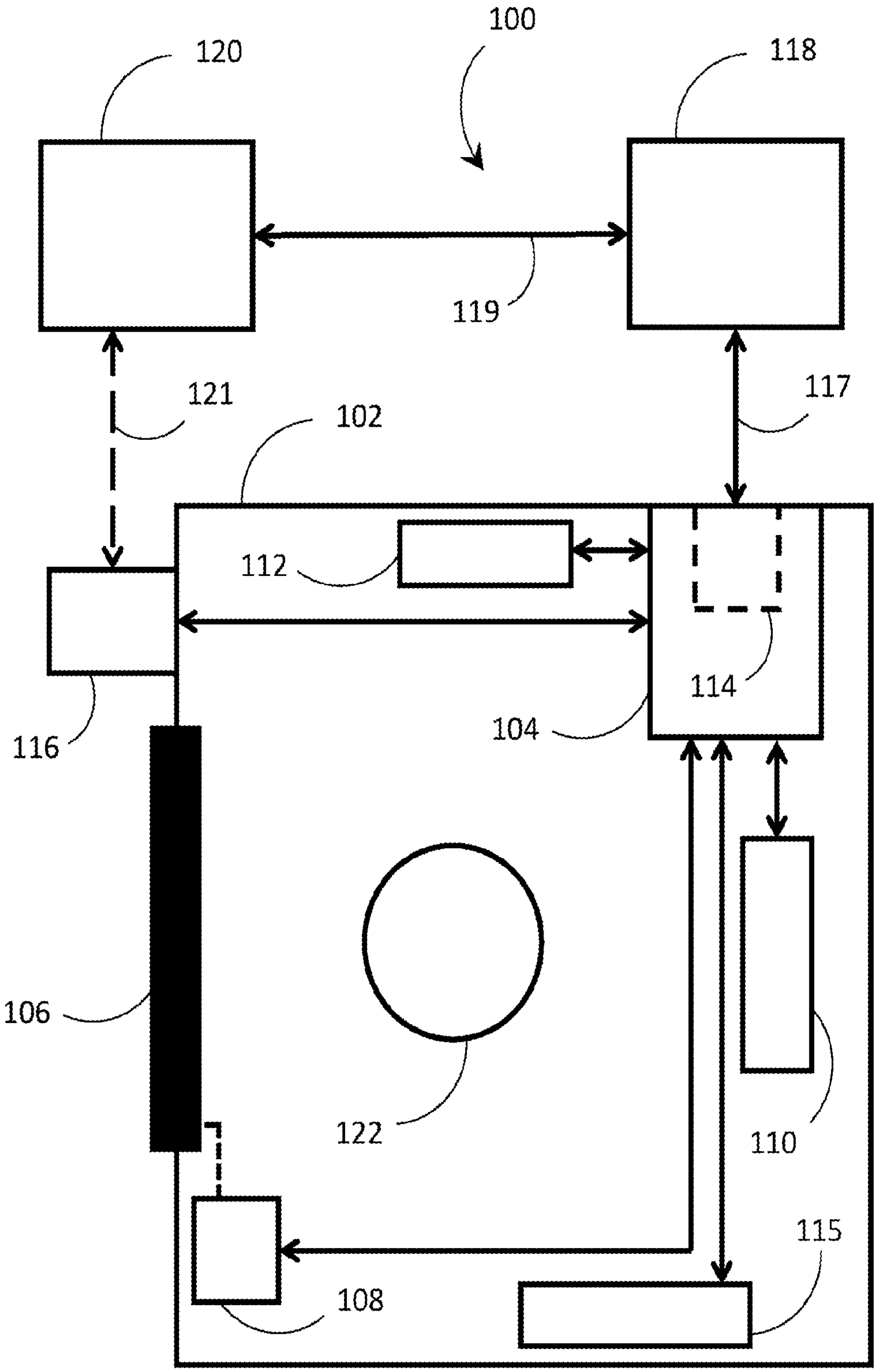
FIG. 1 shows a schematic diagram of a secure storage system in accordance with an embodiment of the present invention.

FIG. 1 shows a schematic view of a secure storage system 100 in accordance with an embodiment of the present invention.

The storage system 100 comprises a container 102. The container 102 is optionally a portable container that can be moved from one location to another and is sized appropriate to the dimensions and quantity of the objects being stored. For example, an intermodal (or "shipping") container or similar may be used. Alternatively, larger or smaller types of portable container can be used. In other embodiments, the container 102 may be a dedicated building (temporary or permanent) or one or more rooms within a building.

The container 102 comprises a door 106 (or hatch or other closable aperture) and is equipped with an electronic lock 108. The electronic lock 108 is configured to lock the door 106 (via actuating a locking mechanism, not shown) so as to prevent/restrict access to the interior of the container 102. As shown, the container 102 is provided with a single door 106, however it will be appreciated that further doors may be provided is required—in this case, all doors are preferably lockable via a common or respective electronic lock. It will be appreciated that the container 102 is preferably constructed such that its interior cannot be accessed by a person except via the door(s) 106.

The container 102 includes an alarm system 112, which preferably comprises conventional intruder detection and annunciation components (for example, passive infrared sensors, shock sensors, proximity sensors, and/or sounders etc.) and, when in an active or armed state, is triggered in response to entry to the container and/or removal of an object from the container. In the preferred embodiment, the alarm system 112 meets British Standard EN50131. In the event that the alarm system 112 is triggered, the alarm system 112 optionally causes an alarm sounder or siren to produce an audible alarm, and preferably sends a signal, directly or via backend server 118, to law enforcement and/or a predetermined third party, the signal indicating an identifier of the container 102, the location of the container 102, and that unauthorised access has been detected.

The container 102 also includes one or more sensors 110 configured to identify retrieval of an object 122 from the container 102 as described in more detail below. In the described embodiment, the one or more sensors 110 include cameras (for example a CCTV system) linked to a machine vision or other image analysis system, and optionally also an optical scanner configured to read machine-readable indicia.

Optionally, the container 102 also includes one or more visual indicators 115 (for example electronic displays, or a lights), preferably positioned on the interior of the container 102. The visual indicator is also communicatively coupled to the backend server 118, e.g. via network 117. In some embodiments the visual indicators 115 are integrated with the one or more sensors 110; more particularly, in these embodiments the one or more visual indicators 115 include an electronic display integrated with a handheld optical scanner.

The container 102 further includes a user input device 116 positioned so as to be accessible from outside the container 102, for example positioned on or proximate an exterior wall of the container 102. The user input device is configured to receive an input directly from a user, and/or from a user device. Preferably, the user input device comprises one or more of the following: a keypad, touch screen or other means for receiving (e.g., alphanumeric) data entry from a user; wireless communication module such as a near field communications (NFC) interface for communicating with a corresponding NFC interface at a user device; an optical scanner configured to read machine-readable indicia; a biometric scanner configured to detect biometric information; an RFID transceiver configured to read an RFID tag; a card reader.

Each of the electronic lock 108, one or more sensors 110, alarm system 112, and user input device 116 (and, where provided, visual indicators 115) is individually addressable and communicatively coupled (e.g., via a wired or wireless data connections) to a network. As shown, the electronic lock 108, one or more sensors 110, alarm system 112, and user input device 116 are networked with an optional local network hub/server 104. Where the container 102 is being deployed in a location with limited infrastructure, the local hub/server 104 preferably includes a cellular/satellite communications interface 114 for establishing a wireless data connection to the internet. In alternative examples, the electronic lock 108, one or more sensors 110, alarm system 112, and user input device 116 are networked with a local area networking server (not shown) located outside the container 102, or are each individually provided with a wired or wireless connection to the internet.

The secure storage system 100 also comprises a backend server 118. Though shown as a single element in FIG. 1, it will be appreciated that the backend server 118 may be embodied by one or more devices in a distributed computing environment or software executing on one or more devices. The backend server 118 is remote from the container, and is configured to communicate with, the electronic lock 108, one or more sensors 110, alarm system 112, and user input device 116 (and, where provided, visual indicators 115), for example either directly or via the local network hub/server 104. The backend server 118 provides an API database and logic interface via which data can be received from, and control instructions sent to, the electronic lock 108, one or more sensors 110, alarm system 112, and user input device 116. In the embodiment shown in FIG. 1, the backend server 118 is configured to establish secure HTTPS API connections via an internet or other network connection 117. As described in more detail below, the backend server 118 receives access requests from users, provides control instructions to the various networked components 108, 100, 112, 115, 116 at the container 102, enabling secure object retrieval from the container 102.

Figure 2:
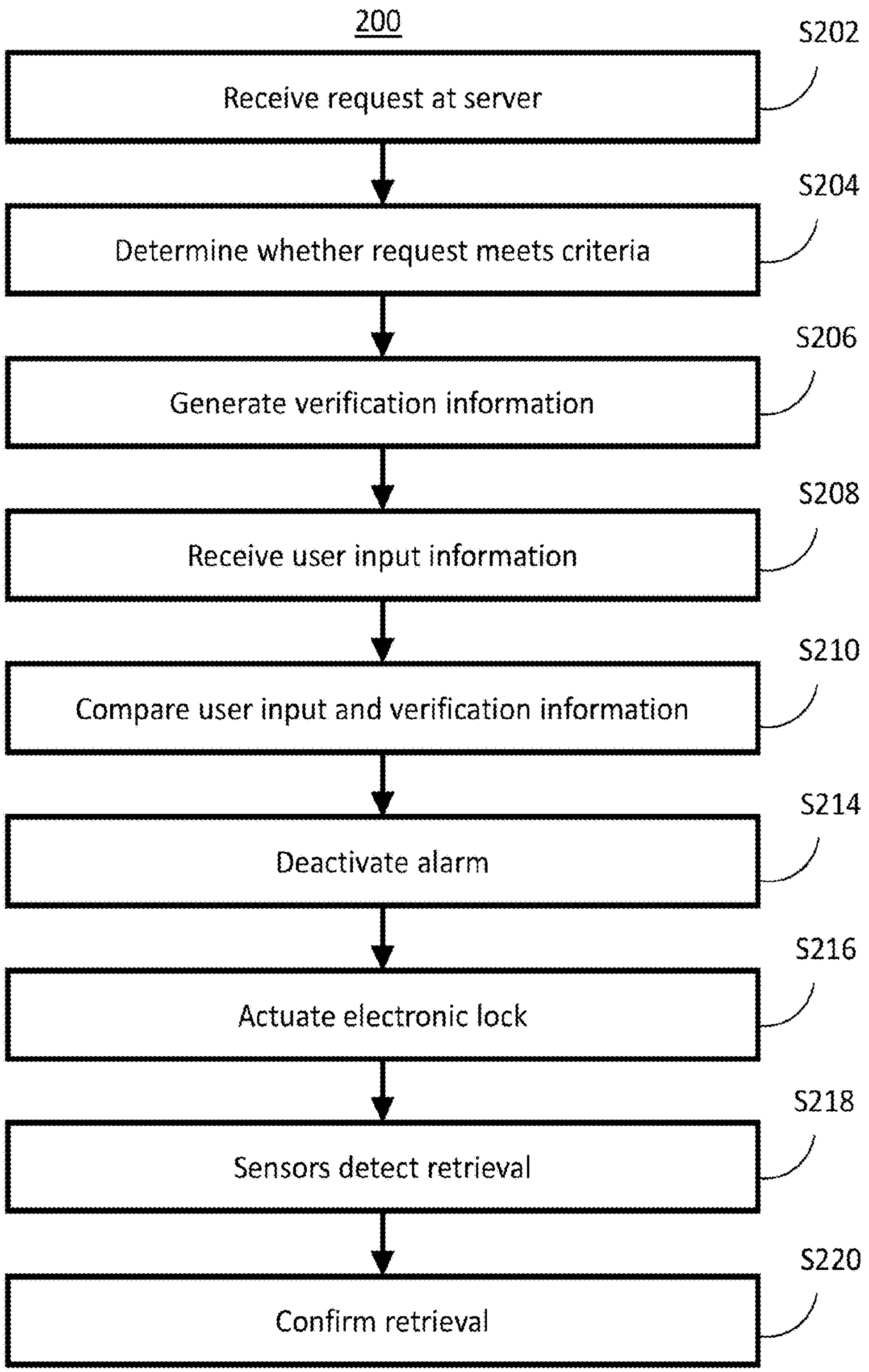
FIG. 2 shows a flow diagram of a method for operating a secure storage system in accordance with an embodiment of the present invention.

FIG. 2 shows a flowchart of a method for operating the secure storage system 100 described above.

At step S202, the backend server 118 receives a request from a first user device 120 to retrieve an object 122 from the container 102 In the preferred embodiment, the backend server 118 provides a web interface frontend, accessible by the first user device 120 via an internet connection 119. Using the web interface, a user of the first user device 120 is able to select the object 122 and submit a request for retrieval. Thus, in this arrangement, selection of the object 122 via the web interface forms part of the request. The first user device 120 therefore only requires an internet connection to be able to make the request. In preferred examples, access to the web interface is restricted by a secure login to further enhance security. In alternative embodiments, the first request is sent in the form of a message by the first user device 120 directly to the backend server 118.

At step S204, the backend server 118 determines whether the request meets predefined criteria. In a preferred example, the predefined criteria relate to the identity and authorisation of the entity making the request. In this case, step S204 includes determining that the request is being made by an entity authorised to retrieve the object 122, for example by requiring a secure login to a user-specific account via the web interface described above. Alternatively, or in addition, the server may check the identity and authorisation of the user using other means known in the art.

In some embodiments, the container 102 is deployed in remote contexts as a retail environment, in which stored objects may be purchased by a user. For example, the container may be deployed on a construction site, and contain construction materials for purchase by construction personnel as construction progresses. In such embodiments, step S202 preferably includes receiving payment information for the object 122 as part of the request, and step S204 preferably includes verifying, processing and/or recording the payment information to enable purchase, and hence authorisation to retrieve, the object 122. In such embodiments, the backend server 118 preferably implements or communicates with an ERP interface to enable backend billing processing.

At step S206, the server generates verification information for accessing the container 102. The verification information specifies at least information that must be received at the user input device 116 in order to enable access to the container 102. The verification information preferably includes one or more of the following: a one-time access code/password character string (e.g. numeric or alphanumeric); a one-time access code encoded as a machine-readable indicia (for example a bar code or QR code); biometric information associated with a user making the request, either provided by the user as part of making the request in step S202, or retrieved by the backend server 118 from a repository based on data included in the request; a unique identifier of a user device (for example an access card, a payment card, an RFID tag, a mobile device etc.), either provided by the user as part of making the request in step S202, or retrieved by the backend server 118 from a repository based on data included in the request. The verification information defines what information must be input at the user input device 116 in order to enable entry to the container 102. The verification information is advantageously unique to the request, and/or unique to the user making the request, thus allowing granular control over who accesses the container 102. In some embodiments, the verification information includes a one-time access code (either character string or machine-readable indicia) in addition to biometric information and/or a unique device identifier, thus allowing multi-factor authentication.

Step S206 preferably also comprises defining a time window as part of the verification information. The time window defines a period between a present time or more preferably a start time in the future, and an end time in the future occurring after the start time. The time window defines a period during which the verification information can be used to obtain access to the container 102 and retrieve the object 122. Outside the time period, the verification information cannot be used to gain access to the container 102. Accordingly, the verification information preferably defines: a) a request-specific input that has to be made at the user input device 116 to gain access to the container 102; and b) a limited period of time during which the input can be made. It will be appreciated that the length of the time window will depend on the precise application of the secure storage system 100. In some embodiments, the backend server 118 is configured to provide the user making the request with one or more possible time windows to select from (e.g., via a web interface), the time window selected by the user being used in the verification information.

The server preferably then transmits at least part of the verification information to the first user device (or another user device). For example, this may be sent by the backend server 118 as an e-mail message or an SMS/MMS message using account information provided by the user (e.g., via a web interface). In this case, the backend server 118 is securely connected to an SMS/MMS API platform and/or a secure email platform. Where either or both of the time window and the generated one-time access code (either as a character string or encoded as machine readable indicia) form part of the verification information, these are included in the message sent to the use using the user account information. The message optionally also includes user instructions for accessing the container 102, using the user input device 116 and/or retrieving the object 122.

Optionally, the backend server 118 is configured to receive a further request for a new time window from the first user device 120 (for example via the web interface). In response, the sever 118 determines a new, different time window (e.g., with different start and end times, and/or a different duration between start and end times), updates the verification information with the new time window, and communicates the updated time window to the first user device.

At step S208 user input information is received at the user input device 116. As noted above, a number of different hardware provisions (and combinations thereof) can be included in the user input device 116, depending on the type of user input information expected.

Where the verification information includes one-time access code in the form of a character string transmitted to a user device (such as the first user device 120), the user input device 116 preferably includes a hardware or touch-screen keypad for receiving entry of the access code by the user. Alternatively, or in addition, the user input device 116 includes one or more cameras configured to capture an image of the access code (for example as displayed on the user device) wherein image analysis software running at the user input device 116 or the backend server 118 is configured to perform an optical character recognition analysis on the captured image to ascertain the access code.

Where the verification information includes a one-time access code encoded as machine readable indicia (such as a barcode or QR code) transmitted to the user device (for example the first user device 120), the user input device 116 includes an optical scanner configured to read the machine-readable indicia (for example, as displayed on the user device).

Where the verification information includes biometric information associated with a user making the request, the user input device 116 includes a biometric scanner, for example a fingerprint reader, or one or more cameras configured to capture images of a user's face/retina/etc.

Where the verification information includes a unique identifier of a user device, the user input device 116 includes a means for retrieving such information from a user device, for example: an RFID reader; an NFC interface; a magnetic strip reader; and/or another communication interface. Optionally, the user input device 120 establishes a wireless data transfer connection 121 (e.g., an NFC or Bluetooth™ connection) with the user device (for example the first user device 120) for the purposes of receiving transmission of the device identifier.

Once received, the user input information is securely transmitted to the backend server 118 for processing (for example via local hub 104). In step S210, the backend server 118 compares the user input information to the verification information. The backend server 118 determines whether the user input information conforms with the verification information, for example, whether the access code/biometric information/user device identifier entered/received at the user input device 116 matches the access code/biometric information/user device identifier included in the verification information.

Preferably, determining whether the user input information conforms to the verification information also includes, determining, by the backend server 118, whether user input information is received during the time window specified in the verification information. For example, the backend server 118 may determine whether a current time (as determined when performing step S210) or a time at which the user input information was received at the user input device 116 (for example as determined by a timestamp captured by the user input device 116 and provided to the backend server 118) falls within the time window.

If the user input information is determined to conform to the verification information, the method proceeds to steps S214 to S220. If the user input information is determined to not conform to the verification information, no further action is taken.

In step S214 the backend server 118 transmits a disarm instruction to the alarm system 112 (e.g., via local hub 104). In response, the alarm system 112 goes into a disarmed or inactive state in which entry to, or accessing of, the container 102 does not trigger the alarm system.

Additionally, the backend server 118 provides an access control instruction to the electronic lock 108 (e.g., via local hub 104). In response to receiving the access control instruction, the electronic lock 108 actuates the locking mechanism, thereby unlocking the door 106 in step S216. Where the verification information includes a time period, the access control instruction optionally also instructs the electronic lock 108 to further actuate the locking mechanism, thereby locking the door 106, upon either, expiry of the time window, or detecting closing of the door 106 subsequent to expiry of the time period. Alternatively, the electronic lock 108 is configured to further actuate the locking mechanism, thereby locking the door 106 as soon as detecting the door 106 has closed. While the door 106 is unlocked, the user is able to access the interior of the portable storage container 102 and retrieve the object 122. Where multiple objects are stored within the container 102, the server 118 optionally transmits instructions to the one or more visual indicators 115 to indicate the location of the object to be retrieved 122 to the user. For example, once the door 106 has been unlocked, an electronic display may indicate one or more locations (e.g., shelf number) within the container 102 where object 122 to be retrieved is stored, or alternatively/in addition illuminate a light positioned proximate to that location.

At step S218, the backend server 118 transmits an activation instruction to the one or more sensors 110 (e.g., via the local hub 104). In response, the one or more sensors 110 enter an active state and are configured to detect retrieval of the object 122 by the user. In the described embodiment, the one or more sensors 110 are configured to detect retrieval of the object 122 automatically without user action. In the preferred embodiment, the one or more sensors 110 include one or more cameras (e.g., a CCTV system) linked to a machine vision or other image analysis system as described above. In response to receiving the activation instruction, the one or more cameras enter an active state in which they capture a sequence of images. Preferably the backend server 118 is configured to transmit the activation signal such that the one or more cameras enter the active state before or concurrently with the door 106 being unlocked. While the door 106 is unlocked, the cameras are preferably configured to continuously capture a sequence of images. The captured images are analysed by the machine vision system. Based on the analysis, the machine vision system is configured to identify and annunciate which object, if any, has been retrieved from the container 102. Preferably, the machine vision system implements machine learning techniques, and is trained to identify retrieval of various objects from the container 102 using one or more neural networks. Optionally, detecting retrieval of the object 122 also involves user action, wherein the user uses the one or more sensors to scan the object 122 being retrieved. For example, the one or more sensors optionally include an optical scanner (for example a handheld optical scanner integrated with an electronic display screen of the visual indicators 115) that the user uses to scan machine readable indicia on the objection 122.

The one or more sensors 110 then send a signal to the backend server 118, indicative of the requested object 122 (and any other different object) having been retrieved form the container 102. In embodiments where the container 102 is used in a retail context, this signal may optionally be used by the backend server 118/ERP interface when completing a payment process and/or keeping track of stock levels stored in the container. The backend server 118 may implement or communicate with a management system for automatically determining stock levels and scheduling stock replenishment cycles. The backend server 118 can also use the confirmation to identify suspected theft from the container 102 if, for example, the confirmation indicates that objects other than the requested object 122 have been removed from the container 102.

Once the object 122 has been retrieved from the container 102, the door 106 is closed (either manually by a user or automatically using a suitable actuation means (not shown), and in response the electronic lock 108 actuates the locking mechanism thereby locking the door 106.

Preferably, the electronic lock 108 detects that the door 106 has been closed and sends a message to the backend server 118 indicating that the door has been closed. In response, the backend server 118 preferably instructs the alarm system 112 to arm/activate, the one or more sensors 107 to deactivate, and the secure storage system 100 awaits the next request from a user for retrieval of an object and/or entry of user input information at the user input device 116. In addition, the backend server 118 marks the verification information as expired, deletes the verification information, or otherwise determines that the verification information can no longer be used to gain access to the container 102. Consequently, if the user were to return to the container 102 and provide the same user input information a second time at the user input device 116, the backend server 118 would determine that the user input information no longer corresponds to valid verification information (even if the second receipt of the user input information occurred within the original time window), and access to the container 102 would be denied.

Accordingly, the present invention allows for secure storage and retrieval of objects at locations that do not have pre-existing infrastructure or permanent storage facilities. Access can beneficially be managed entirely remotely using the backend server 118 and its API interface. Advantageously, this also makes the system 100 inherently scalable and adaptable. The backend server 118 can control access to multiple containers 102. Networked API-level communication enables access control systems to be provided in a modular manner; various types of containers can easily be retrofitted with appropriate electronic locks 108, sensors 110, alarm systems 112 and user input devices 116 to provide secure object storage efficiently and effectively.

In contexts such as construction sites, the present invention can advantageously be used in a retail context, allowing construction personnel to purchase and retrieve objects using the secure storage system 100, reducing the number of deliveries required (with commensurate benefits in reduced energy consumption/emissions associated with vehicles making deliver to the construction site). Additionally, stock levels within the container 102 can be remotely monitored using the system 100, meaning that deliveries can be scheduled from a supplier to the container 102 only when required and responsive to demand at the construction site. In some embodiments the backend server 118 is configured to analyse requests for object retrieval to determine usage patterns and predict when more objects need to be added to the container 102.

It will be appreciated that the method described above in relation to FIG. 2 may alternatively have steps performed in a different order, have certain steps omitted, and/or include additional steps. For instance, the various instructions transmitted by the backend server in steps S214 to S218 may be sent in a different order or simultaneously.

In an embodiment of the invention, a computer readable medium (for example a non-transitory computer-readable medium) is provided, the computer readable medium storing computer-executable instructions that, when executed by one or more processors, cause the one or more processors to perform the method described above.

The above embodiments are provided as examples only. The scope of the invention is defined by the appended independent claims. The invention covers all variations and equivalents as fall within the scope of the appended independent claims.

The invention claimed is:

1. A secure storage system comprising:
a server;
a container comprising:
a door;
a user input device;
an electronic lock, the electronic lock configured to lock the door in a closed position thereby restricting access to the container;
one or more sensors; and
an alarm system, wherein, in an active state the alarm system is configured to be triggered in the event of unauthorised access to the container or an unauthorised retrieval of one or more objects from the container;
wherein the server is configured to communicate with the electronic lock, the one or more sensors, the alarm system and the user input device, the server configured to:
receive, from a first user device, a first request for retrieval of a first object from the container;
determine whether the first request associated with the first user device meets one or more predefined criteria; and
if the first request meets the one or more predefined criteria, generate verification information specific to the first request;
receive user input information from the user input device;
compare the user input information to the verification information; and
if the user input information is determined to conform with the verification information, the server is configured to:
transmit a disarm instruction to the alarm system, wherein the alarm system is configured to enter a disarmed state responsive to receiving the disarm instruction;
transmit an access control instruction to the electronic lock, wherein the electronic lock is configured to unlock the door responsive to receiving the access control instruction, thereby enabling access to the container;
transmit an activation instruction to the one or more sensors, wherein the one or more sensors are configured to determine when the first object has been removed from the container responsive to receiving the activation instruction;
receive a signal from the one or more sensors indicative of the first object having been retrieved.

2. The secure storage system of claim 1, wherein:
the server comprises an API interface; and
the electronic lock, the one or more sensors, the alarm system and the user input device are each:
connected to a network;
individually addressable; and
configured to communicate with the API interface via the network.

3. The secure storage system of claim 1, wherein the verification information comprises an expected user input information and a first time window for receiving user input;
wherein the server determines that the user input information conforms with the verification information if:
the received user input information matches the expected user input information; and
the received user input information is received within the first time window.

4. The secure storage system of claim 3, wherein the server is further configured to:
receive, prior to receiving user input information, a second request from the first user device, the second request specifying a second time window; and
update the verification information with a second time window;
wherein the server determines that the user input information conforms with the updated verification information if:
the received user input information matches the expected user input information; and
the received user input information is received within the second time window.

5. The secure storage system of claim 1, wherein:
the verification information comprises an access code; and
the user input device comprises a user interface for entering the access code.

6. The secure storage system of claim 1, wherein:
the verification information comprises a unique identifier associated with or provided to the first user device or another user device; and
the user input device comprises a wireless communication module configured to receive the unique identifier from the first user device or the another user device.

7. The secure storage system of claim 1, wherein:
the verification information comprises retrieved image or biometric information; and
the user input device comprises a camera and/or biometric information scanner.

8. The secure storage system of claim 1, wherein the one or more sensors comprise:
one or more cameras in communication with a machine vision system;
wherein the machine vision system is configured to analyse images captured by the one or more cameras to identify retrieval of an object from the container, and determine whether the retrieved object corresponds to the first object.

9. The secure storage system of claim 1, wherein the one or more sensors comprise:
an optical scanner configured to scan machine-readable indicia.

10. The secure storage system of claim 1, wherein the container is a portable container.

11. A method for operating a secure storage system, the secure storage system comprising a server and a container comprising a door, a user input device, an electronic lock, one or more sensors and an alarm system,
the method comprising:
receiving, at the server and from a first user device, a first request for retrieval of a first object from the container;
determining, by the server, whether the first request associated with the first user device meets one or more predefined criteria; and if the first request meets the one or more predefined criteria, generating, by the server, verification information specific to first request;

receiving, by the user input device, user input information;

transmitting, by the user input device, the user input information input to the server;

comparing, by the server, the user input information to the verification information; and if the user input information is determined to conform with the verification information:

transmitting, by the server, a disarm instruction to the alarm system;

responsive to receiving the disarm instruction, entering, by the alarm system, a disarmed state;

transmitting, by the server, an access control instruction to the electronic lock;

responsive to receiving the access control instruction, unlocking, by the electronic lock, the door;

transmitting, by the server, an activation instruction signal to the electronic lock;

responsive to receiving the activation instruction, determining, by the one or more sensors, whether an object has been retrieved from the container;

transmitting, by the one or more sensors, a signal indicative of the first object having been retrieved.

12. The method of claim 11, wherein:

the server comprises an API interface; and the electronic lock, the one or more sensors, the alarm system and the user input device are each:

connected to a network;

individually addressable; and configured to communicate with the API interface via the network.

13. The method of claim 11, wherein the verification information comprises an expected user input information and a first time window for receiving user input; and wherein determining that the user input information conforms with the verification information comprises:

determining that the received user input information matches the expected user input information; and determining that the received user input information is received within the first time window.

14. The method of claim 13, further comprising:

receiving, at the server and prior to receiving user input information, a second request for retrieval of the first object from the container, the second request corresponding to the first request; and updating, by the server, the verification information with a second time window;

wherein determining that the user input information conforms with the updated verification information comprises:

determining that the received user input information matches the expected user input information; and determining that the received user input information is received within the second time window.

15. The method of claim 11, wherein:

the verification information comprises an access code; and receiving the user input information comprises receiving entry of the access code at a user interface of the user input device.

16. The method of claim 11, wherein:

the verification information comprises a unique identifier associated with or provided to the first user device or another user device; and receiving the user input information comprises receiving the unique identifier from the first user device or the another user device via a wireless communication module at the user input device.

17. The method of claim 11, wherein:

the verification information comprises retrieved image or biometric information; and receiving the user input information comprises detecting the biometric information using a camera and/or a biometric information scanner at the user input device.

18. The method of claim 11, wherein the one or more sensors comprise one or more cameras in communication with a machine vision system, the method comprising:

capturing, by the one or more cameras, one or more images;

analysing, by the machine vision system, the one or more images to identify retrieval of an object from the container;

determining, by the machine vision system, that the retrieved object corresponds to the first object;

generating, by the machine vision system, the signal from the one or more sensors indicative of the first object having been retrieved.

19. The method of claim 11, wherein the one or more sensors comprise an optical scanner, the method comprising:

reading, by the optical scanner, machine readable indicia on the first object;

generating, by optical scanner, the signal from the one or more sensors indicative of the first object having been retrieved.

20. A computer-readable medium storing executable instructions that, when executed by one or more processors, cause the processors to perform a method comprising:

receiving, from a first user device, a first request for retrieval of a first object from a container;

determining whether the first request associated with the first user device meets one or more predefined criteria; and if the first request meets the one or more predefined criteria, generating verification information specific to the first request;

receiving, from a user input device of the container, user input information;

comparing the user input information to the verification information; and if the user input information is determined to conform with the verification information:

transmitting a disarm instruction to an alarm system of the container causing the alarm system to enter a disarmed state;

transmitting an access control instruction to an electronic lock of the container causing a door of the container to be unlocked;

transmitting an activation instruction signal to one or more sensors of the container;

receiving, from the one or more sensors of the container, a signal indicative of the first object having been retrieved.

* * * * *